United States Patent [19]

Timlin

[11] Patent Number: 4,947,919
[45] Date of Patent: Aug. 14, 1990

[54] AUTOMATED TIRE MOUNTING AND INFLATION SYSTEM

[76] Inventor: Patrick M. Timlin, P.O. Box 297, Justin, Tex. 76247

[21] Appl. No.: 400,100

[22] Filed: Aug. 29, 1989

[51] Int. Cl.$^5$ ............................................. B60C 25/135
[52] U.S. Cl. ..................................... 157/1.24; 157/1.1
[58] Field of Search ..................... 157/1, 1.1, 1.17, 1.2, 157/1.24, 1.22

[56] References Cited

U.S. PATENT DOCUMENTS

| | | |
|---|---|---|
| 2,817,394 | 12/1957 | Xriebel, Jr. et al. |
| 2,900,015 | 8/1959 | Harrison |
| 2,900,018 | 8/1959 | Harrison |
| 3,366,153 | 1/1968 | Allen ........................... 157/1.1 |
| 3,490,512 | 1/1970 | Ghyselinck ............... 157/1.24 |
| 3,978,903 | 9/1976 | Mueller et al. ............. 157/1.2 |
| 4,621,671 | 11/1986 | Kane et al. |
| 4,789,015 | 12/1988 | Flinn |
| 4,800,942 | 1/1989 | Timlin |

FOREIGN PATENT DOCUMENTS

| | | | |
|---|---|---|---|
| 1143618 | 3/1985 | U.S.S.R. | 157/1.24 |
| 1152809 | 4/1985 | U.S.S.R. | 157/1.24 |

*Primary Examiner*—D. S. Meislin
*Attorney, Agent, or Firm*—Charles D. Gunter, Jr.

[57] ABSTRACT

An automated tire mounting and inflation system is shown which includes a tire mounting station for seating an uninflated tire on a wheel rim with the tire upper and lower beads between the rim flanges. A conveyor moves the uninflated tire from the mounting station to an inflation station. An inflation bell is lowered at the inflation station to contact the tire upper sidewall and form an airtight enclosure whereby air can be supplied to the interior of the bell, air pressure passing between the tire bead and wheel flange around the entire perimeter of the rim to inflate the tire. The conveyor then moves the inflated tire from the inflation station to a staging area.

7 Claims, 5 Drawing Sheets

AUTOMATED TIRE MOUNTING AND INFLATION SYSTEM

BACKGROUND OF THE INVENTION

1. Field of the Invention

The present invention relates to high production mounting and inflation of tubeless tires to wheel rims.

2. Description of the Prior Art

The automated seating and inflation of pneumatic tires on wheel rims has brought about the development of various specialized equipment for this purpose. Various systems have been proposed to provide bead seating and inflation of tubeless tires in a minimum amount of time with a minimum amount of effort and supervision.

The present invention has as its object to provide an automated, high-production tire and wheel rim processing system which will mount the tire to a wheel rim with a minimum of manual effort.

Another object of the invention is to provide an automated tire mounting and inflation system which minimizes the possibility of marring or damaging expensive alloy wheel rims.

Another object of the invention is to provide such an automated tire mounting and inflation system which is simple in design and economical to construct.

SUMMARY OF THE INVENTION

The automated tire mounting and inflation system of the invention is used to mount and inflate tubeless tires of the type having upper and lower tire beads between the opposing flanges of selected wheel rims. The system includes a tire mounting station with mounting means for seating an uninflated tire on a wheel rim with the tire upper and lower beads between the wheel rim flanges. A conveyor is provided having a transport means mounted upon a frame. The transport means preferably includes spaced-apart travelling chains for receiving and transporting an uninflated tire which has previously been mounted on a wheel rim.

An inflation station is located downstream of the mounting station on the conveyor for inflating the uninflated tire as the uninflated tire and rim are conveyed past the inflation station on the conveyor. Lift means alternately lift the conveyor frame to engage the uninflated tire and wheel rim on the travelling chains and lower the conveyor frame when the inflation station is reached to disengage the uninflated tire and wheel rim. In this way, the uninflated tire and wheel rim are properly positioned at the inflation station. Inflation means, located at the inflation station, inflate the tire on the wheel rim. The conveyor can then be reactivated to engage the inflated tire and rim to move the same off the conveyor to a staging area.

Additional objects, features and advantages will be apparent in the written description which follows.

BRIEF DESCRIPTION OF THE DRAWINGS

in FIG. 2 showing the tire being transported on the travelling chains;

DETAILED DESCRIPTION OF THE INVENTION

Figure 1:
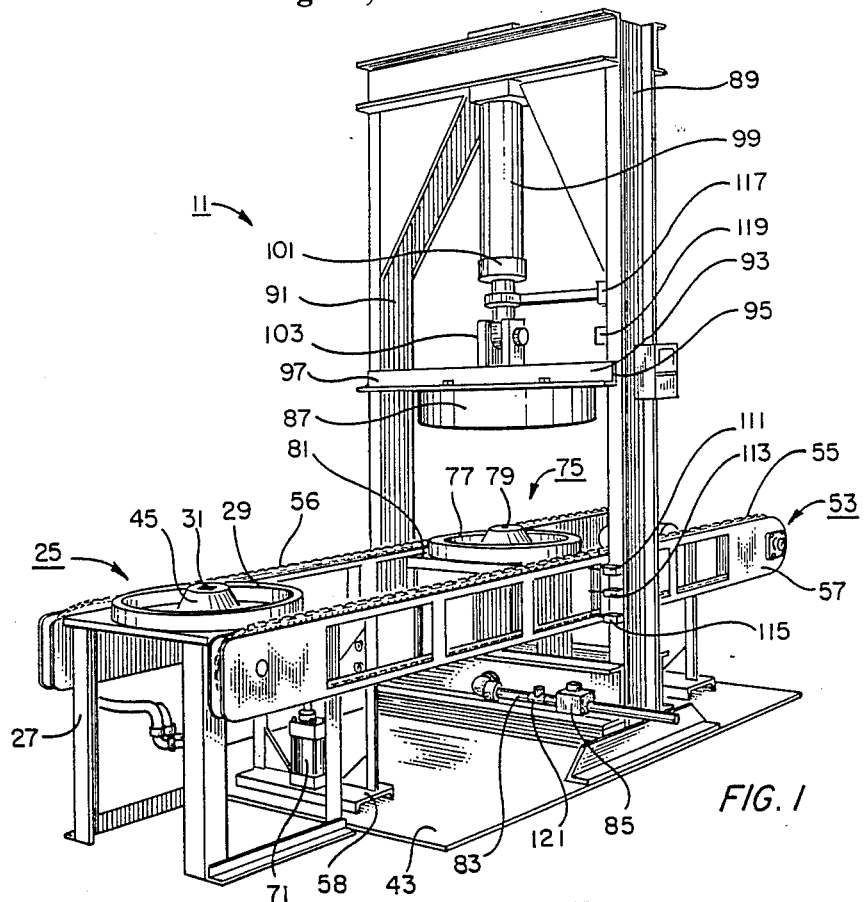
FIG. 1 is a front, perspective view of the tire mounting and inflation system of the invention.

FIG. 1 shows an automatic tire mounting and inflation system of the invention designated generally as 11. The system 11 is used for mounting and inflating a tubeless tire (13 in FIG. 3) of the type having upper and lower tire beads 15, 17 between the opposing flanges 19, 21 of selected wheel rims 23.

Figure 2:
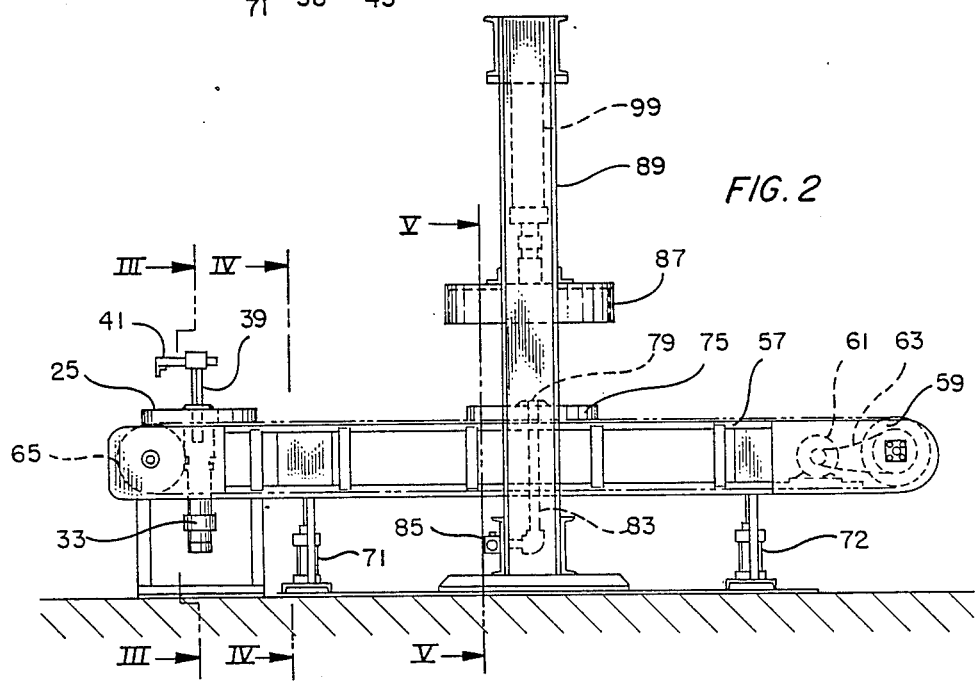
FIG. 2 is a side, schematic view of the system of FIG. 1 showing certain of the internal components in simplified fashion.
Figure 3:
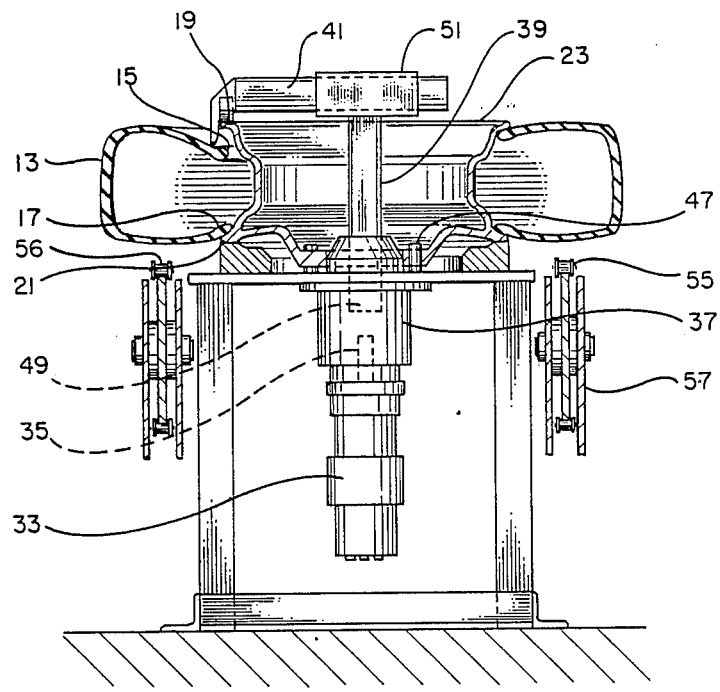
FIG. 3 is an end view of the system of FIG. 1 taken along lines III—III, showing an uninflated tire being seated on a rim with portions of the device shown in cross-section.

As shown in FIGS. 1 and 2, the system 11 includes a tire mounting station 25 with mounting means for seating an uninflated tire on a wheel rim with the tire upper and lower beads between the rim flanges (FIG. 3). The mounting means includes a circular rim supporting surface 29 and a central aperture 31. The rim supporting surface 29 is stationarily mounted on a stand 27 which makes up a portion of the base of the system. A hydraulic motor 33 (FIG. 3) has an output shaft 35 which terminates in a coupling 37 for a tool driving extension 39. The output shaft 35 is arranged in the base 27 generally perpendicular to the plane of the rim supporting surface 29 with the coupling 37 aligned with the central aperture 31. A removable tool driving extension 39 is received within the coupling 37 and engages a tire tool 41 for driving the tire tool in a circumferential path about the wheel rim 23.

As best seen in FIGS. 1 and 3, the wheel rim supporting surface 29 is a generally disk-shaped member arranged in a plane generally parallel to the surrounding floor 43. The central aperture 31 is located within a truncated cone-shaped protrusion 45. A plurality of locater lugs 47 are spaced about the central aperture 31 and are arranged in a pattern for registration with at least two of the bolt receiving openings of the vehicle rim 23. By using the locater lugs 47 and wheel rim openings, the rim can be engaged on the base without danger of marring special or decorative rims.

A suitable hydraulic motor 33 can be obtained from a number of commercial sources and will be familiar to those skilled in the art. Preferably, the female coupling 37 is provided with a square recess for engaging the square end of the tool driving extension 39. As seen in FIG. 3, the output shaft 35 is recessed within the coupling 37 so that the coupling does not extend above the plane of the wheel rim supporting surface 29. The tool driving extension 39 has a square end 49 which is adapted to be engaged by the female coupling 37. An opposite latch end 51 of the tool driving extension 39 is adapted to receive one end of a tire installation tool 41. Powering the hydraulic motor 33 causes the tire tool 41 to travel in a circumferential path about the rim flange 19 so as to position the upper bead 15 beneath the flange. Further details on the operation of motor 33, tool driving extension 39 and installation tool 41 can be obtained from Applicants U.S. Pat. No. 4,800,942, issued Jan. 31, 1989, the disclosure of which is hereby incorporated by reference.

Transport means, such as conveyor 53 are provided for receiving and transporting an uninflated tire which has previously been mounted on a wheel rim at the tire mounting station 25. The conveyor includes a longitudinal frame 57, having a pair of travelling chains 55, 56 mounted in parallel fashion on the frame 57. Preferably, the chains 55, 56 are driven by means of a drive sprocket 59 (FIG. 2) located on the frame 57. The drive sprocket 59 is turned by means of a motor 61 and drive belt 63, the motor also being affixed to the frame 57. An idler sprocket 65 is located at the opposite end of the frame 57.

Figure 4:
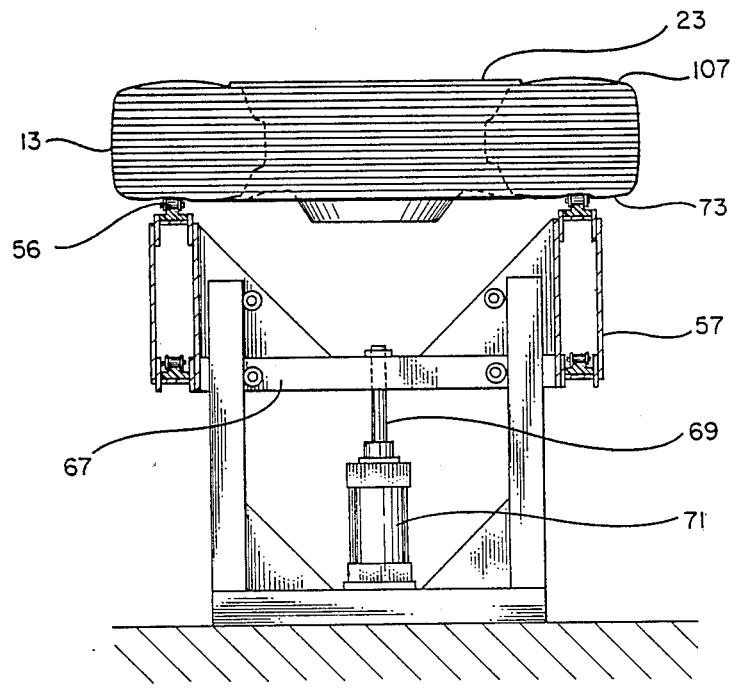
FIG. 4 is an end view similar to FIG. 3, taken along lines IV—IV.

As shown in FIG. 4, the frame 57 includes one or more cross members 67. The cross member 67 is connected to the output shaft 69 of a hydraulic piston 71 which is mounted on a stationary base 58, whereby the entire frame 57 is moveable in vertical fashion between a lowered position, as shown in FIGS. 1 and 3, and a raised position, shown in FIG. 4. Raising the frame 56 causes the travelling chains 55, 56 to contact the tire lower surface 73 (FIG. 4), whereby the tire is transported from the tire mounting station 25 to an inflation station 75.

The inflation station 75 (FIG. 1) includes a wheel rim supporting surface 77 and a central aperture 79, similar to the mounting station 25. The rim support surface 77 is stationarily mounted on a stand 81 and is not raised and lowered with the frame 57. Central aperture 79 communicates with an air supply line 83 which is, in turn, connected to a pressurized air source (not shown), such as a collector tank and compressor. The air supply to the aperture 79 is controlled by means of a solenoid valve 85 located in the supply line 83.

By alternately actuating the hydraulic pistons (71, 72 in FIG. 2), the frame 57 serves as a lift means for engaging an uninflated tire and wheel rim on the conveyor and for lowering the conveyor frame when the inflation station is reached to disengage the uninflated tire and wheel rim, whereby the uninflated tire and wheel rim are properly positioned at the inflation station. The central aperture 79 and associated air supply line 83 and solenoid 85 comprise supply means located at the inflation station 75 for supplying air to inflate the tire on the wheel rim.

The inflation station 75 also includes containment means for isolating the inflatable region of the tire during inflation. Preferably, the containment means includes a cylindrical inflation bell 87 which is mounted on a pair of stationary braces 89, 91. A cross member 93 supports the bell 87 and has opposing ends which are engaged in mating tracks on the braces 89, 91 for vertical movement with respect to the braces. A main piston 99 has an output shaft 101 which is coupled to the cross member 93 by means of yoke 103 for raising and lowering the bell 87.

Figure 5:
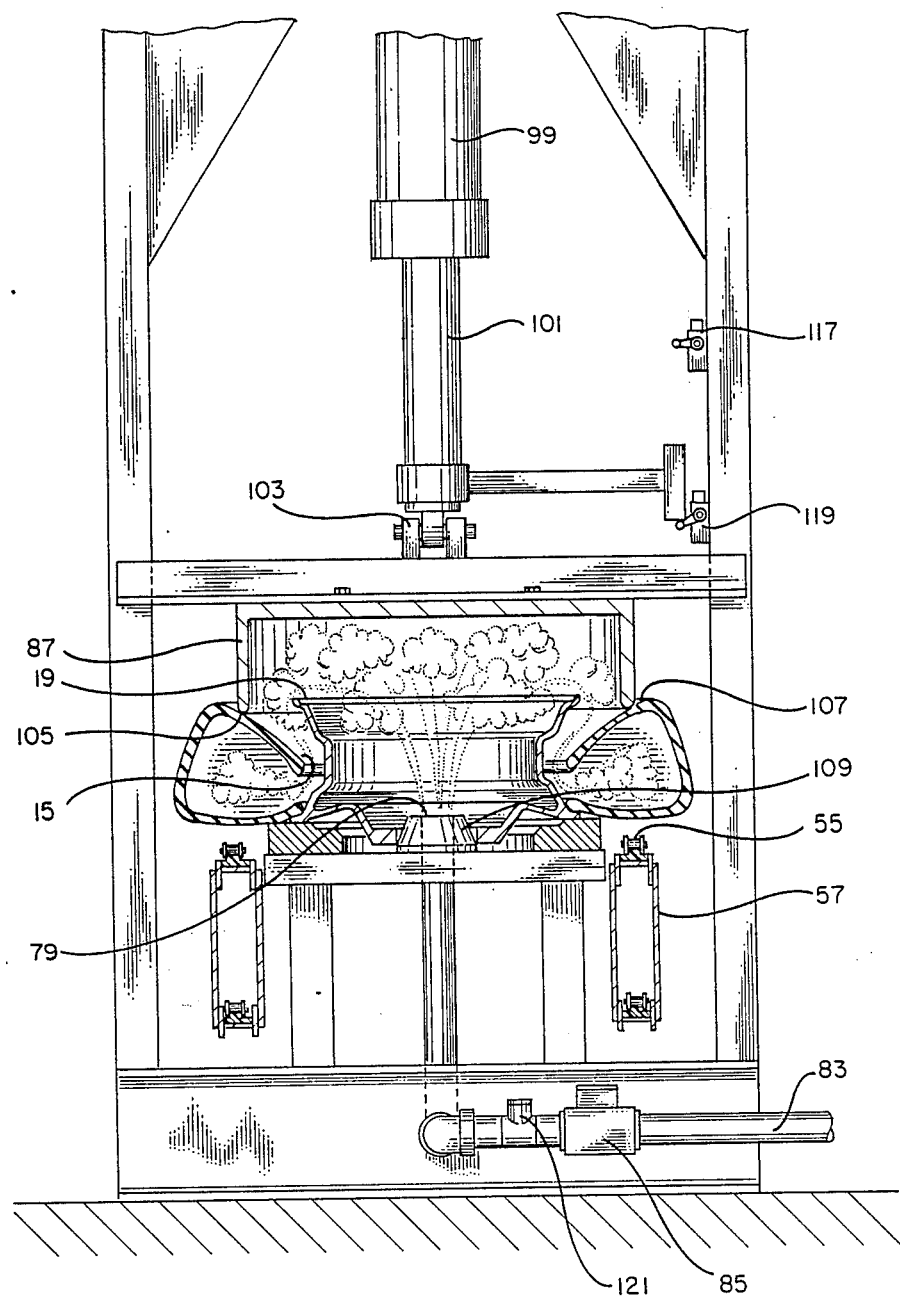
FIG. 5 is a view similar to FIG. 4 taken along lines V—V, in FIG. 2 showing the inflation of the tire at the inflation station.
Figure 6:
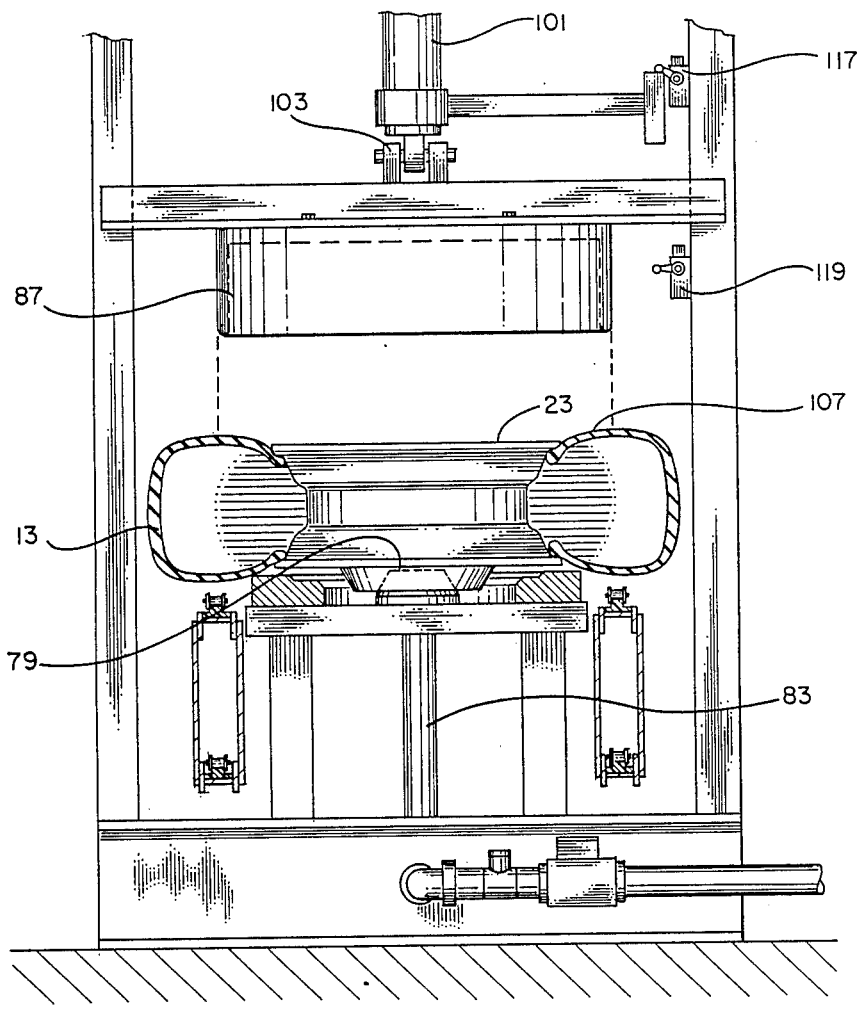
FIG. 6 is an isolated view of the inflation station, similar to FIG. 5, showing the fully inflated tire on the wheel rim.

As best seen in FIG. 5, the diameter of the bell 87 is selected to allow the bell lower surface 105 to seat on the tire upper surface 107 outside the diameter of the rim flange 19 but inside the tread area. In the inflation position shown in FIG. 5, the bell lower surface 105 bears downwardly on the sidewall 107 of the tire at a position intermediate the bead 15 and the tread thereof, whereby the contact provides an air seal and holds the bead of the tire away from its seating flange 19. The conical surface 109 of the inflation station engages the metal rim 23 to form a suitable air seal on the bottom side of the rim. Inflation occurs between the tire bead and the wheel flange 19 around the entire perimeter of the rim.

Thus, the lowered bell 87 defines a completely enclosed air chamber communicating with the radially inner portion of the tire exterior sidewall and with the interior of the tire whereby air can be supplied through the aperture 79 to the encapsulated regions of the tire. Air pressure introduced within this chamber acts equally on both sides of those portions of the tire within the periphery of the bell. However, pressure within the tire operating on those regions of the tire radially exterior of the periphery of the sealing edge of the cylindrical bell is opposed only by atmospheric pressure, thereby permitting initial inflation to expand the tire interior until the tire bead 15 comes into sealing contact with the wheel flange 19.

Figure 7:
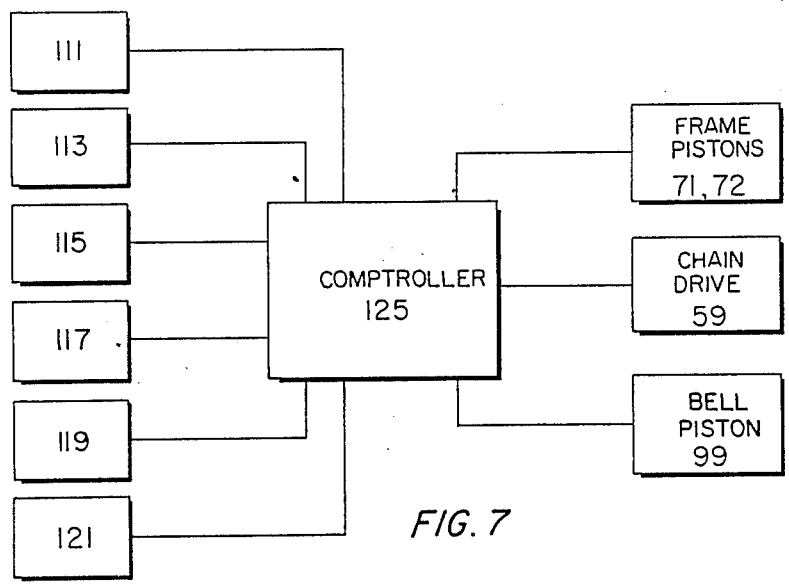
FIG. 7 is a simplified schematic of the electrical controller used to operate the system of the invention.

An electrical controller (125 in FIG. 7) is provided for (1) automatically moving the uninflated tire and wheel rim from the mounting station 25 to the inflation station 75; (2) lowering the bell 87 over the tire at the inflation station 75; (3) supplying a predetermined air pressure through the aperture 79 for inflating the tire on the wheel rim; (4) raising the bell; and (5) moving the inflated tire off the conveyor to a staging area. The controller is fed position signals from upper, middle and lower limit switches 111, 113, 115 mounted on the vertical brace 89, the switches being contacted by the moveable frame 57 as it moves between the raised and lowered positions. The controller is also fed signals from top and bottom limit switches 117, 119 which are contacted by the output shaft 101 of the main piston 99 as it raises and lowers the bell 87. Finally, the controller receives signals from the solenoid valve 85 and an associated pressure sensor 121 located in the air supply line 83. Those skilled in the art will appreciate that the controller 125 can conveniently comprise an appropriately programmed microprocessor of the type customarily used in electro-mechanical control systems.

The overall operation of the system will now be described. A tire is first manually positioned on the wheel rim supporting surface 29 (FIG. 1) of the tire mounting station 25. The tool driving extension 39 (FIG. 3) is then inserted through the central opening in the wheel rim to engage the female coupling 37 of the hydraulic motor 33. A tire tool 41 is inserted within the latch end 51 of the tool driving extension and the motor 33 is powered to drive the tool 41 in a circumferential path to install the tire bead 15 about the rim flange 19. The motor 33 can be controlled, for instance, by means of a foot pedal located adjacent the stand 27. The tire tool 41 and tool driving extension 39 are then withdrawn from the coupling 37.

At this point, the lift means is actuated, causing pistons 71, 72 to raise the frame 57. As the frame is being raised, middle limit switch 113 is tripped, thereby actuating the motor 61 which drives the travelling chains 55, 57. FIG. 4 shows an uninflated tire resting upon the travelling chains as it is moved from the mounting station 25 to the inflation station 75. As the frame 57 reaches its uppermost position, the upper limit switch 111 is tripped, causing the pistons 71, 72 to retract and the frame to be lowered. As the frame lowers, switch 113 is tripped, shutting off the motor 59. The frame 57 continues to move downward until the lower limit switch 115 is tripped. The total time delay between the lift actuation and frame shutdown is sufficient to position the tire at the inflation station. Preferably, this predetermined time delay is on the order of 3.5 seconds.

Tripping of the lower limit switch 111 causes the bell 87 to be lowered until limit switch 119 is contacted. Switch 119 opens the solenoid valve 85, thereby supplying air through the supply line 83 to the interior of the bell, as best seen in FIG. 5. Once a predetermined inflation pressure is reached, as determined by sensor 121, solenoid valve 85 is closed and bell 87 is raised. The top limit switch 117 notifies the controller when the bell has reached the upper most position.

Figure 8:
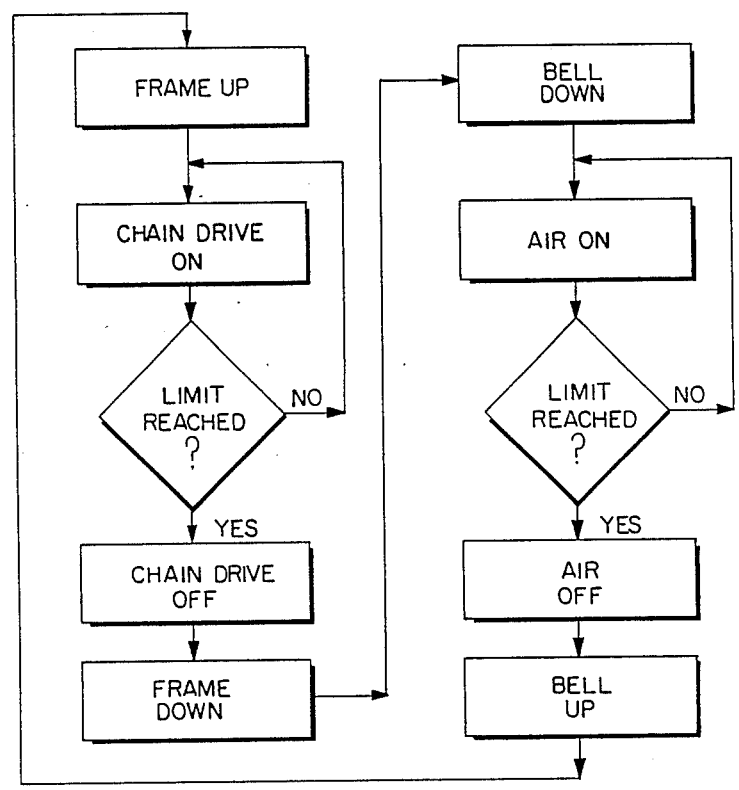
FIG. 8 is a simplified, operational diagram of the steps in the tire mounting and inflation method of the invention.

A new, uninflated tire and rim can now be placed on the mounting station 25 for seating the uninflated tire on the rim. The frame is then raised and the chain drive is actuated, as previously described. This allows the inflated tire and rim on the inflation station 75 to be moved from the inflation station off the end of the conveyor to a staging area. The logic steps followed in the system operation are illustrated in block diagram fashion in FIG. 8.

An invention has been provided with several advantages. The tire mounting and inflation system is simple in design and operation making it well suited for the rugged tire mounting operating environment. The system provides a high production rate mounting and inflation operation so that 400—500 tires can be processed easily in a single day. Tires are evenly seated on the wheel rim and even decorative rims are not marred or damaged.

While the invention has been shown in only one of its forms, it is not thus limited but is susceptible to various changes and modifications without departing from the spirit thereof.

I claim:

1. An automated tire mounting and inflation system for mounting and inflating tubeless tires of the type having upper and lower tire beads between the opposing flanges of a selected wheel rim, the system comprising:
   a main frame;
   a tire mounting station on said main frame;
   mounting means located at said tire mounting station for seating an uninflated tire on a wheel rim with the tire upper and lower beads between the rim flanges;
   a conveyor including transport means mounted on a frame for receiving and transporting an uninflated tire which has previously been mounted on a wheel rim at said tire mounting station;
   an inflation station located downstream of said mounting station on said main frame for inflating said uninflated tire as said uninflated tire and rim are conveyed past said inflation station on said conveyor;
   lift means for alternately lifting said conveyor frame to engage said uninflated tire and wheel rim on an upper surface of said conveyor and for lowering said conveyor frame when said inflation station is reached to disengage said uninflated tire and wheel rim, whereby said uninflated tire and wheel rim are properly positioned at said inflation station;
   inflation means located at said inflation station for inflating said tire on said wheel rim; and
   wherein said inflation means includes a base having a wheel rim supporting surface with a central aperture connected to an air supply line, the inflation means also including an inflation bell having a cylindrical lower surface which is adapted to contact a portion of the tire sidewall when the tire and wheel rim are received on the wheel rim supporting surface to thereby isolate an inflatable region of the tire, whereby air can be supplied through the central aperture to inflate the tire.

2. The automated tire mounting and inflation system of claim 1, wherein the inflation means further comprises a main piston having an output shaft connected to the inflation bell, the bell being mounted for vertical movement between a pair of support braces.

3. The automated tire mounting and inflation system of claim 2, further comprising control means for moving an uninflated tire and wheel rim from the mounting station to the inflation station, lowering and raising the inflation bell, supplying air pressure for inflating the tire on the wheel rim and moving the inflated tire and wheel rim off the conveyor.

4. The automated tire mounting and inflation system of claim 3, wherein said control means includes a middle limit switch mounted on a selected one of the bell support braces and contactable with said conveyor frame which is tripped during the lowering of the conveyor frame, tripping of the middle limit switch serving to actuate the transport means.

5. The automated tire mounting and inflation system of claim 4, wherein said control means includes a lower limit switch mounted on a selected one of the bell support braces which is actuable by the lowering of said conveyor frame as an uninflated tire and wheel rim are positioned at said inflation station, said lower limit switch being connected to a hydraulic power source for lowering said inflation bell over said tire.

6. The automatic tire mounting and inflation system of claim 5, further comprising:
   a bottom limit switch located on the bell support braces which is actuable by the lowering of the inflation bell, said bottom limit switch being connected to a solenoid valve located in said air supply line for controlling the supply of air to the inflation bell.

7. The automatic tire mounting and inflation system of claim 6, further comprising:
   a pressure sensor associated with the solenoid valve in the air supply line for detecting a predetermined inflation pressure within the inflation bell, said pressure sensor being connected to the bell piston for raising the inflation bell from the lowered position once the predetermined pressure is reached.

* * * * *